Aug. 8, 1961  C. W. KRUCKEBERG ET AL  2,995,097
INCINERATING TOILET
Filed March 19, 1956  8 Sheets-Sheet 1

CHRISTIAN W. KRUCKEBERG
ROBERT J. JAUCH
INVENTORS

BY Edmund M. E. Kamm
ATTORNEY

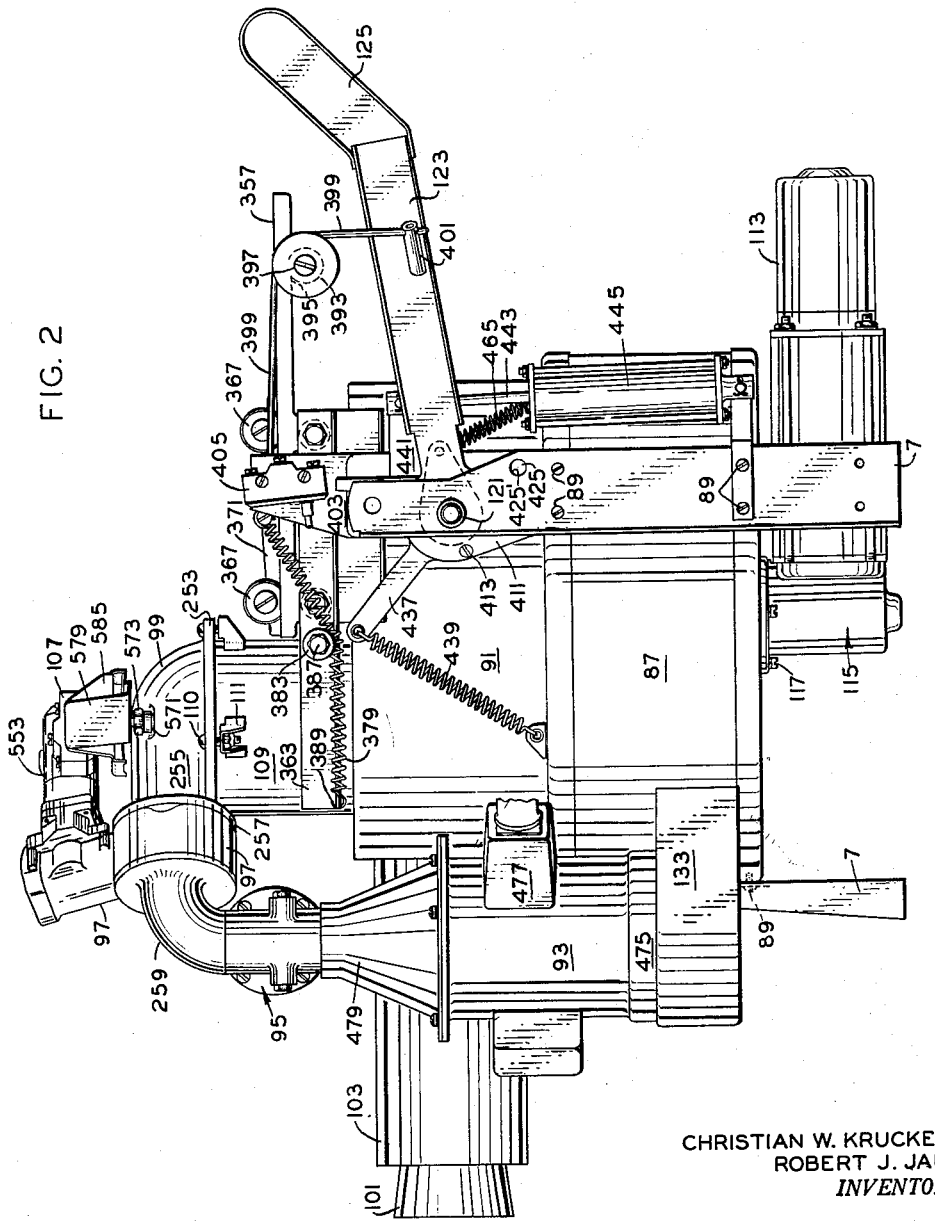

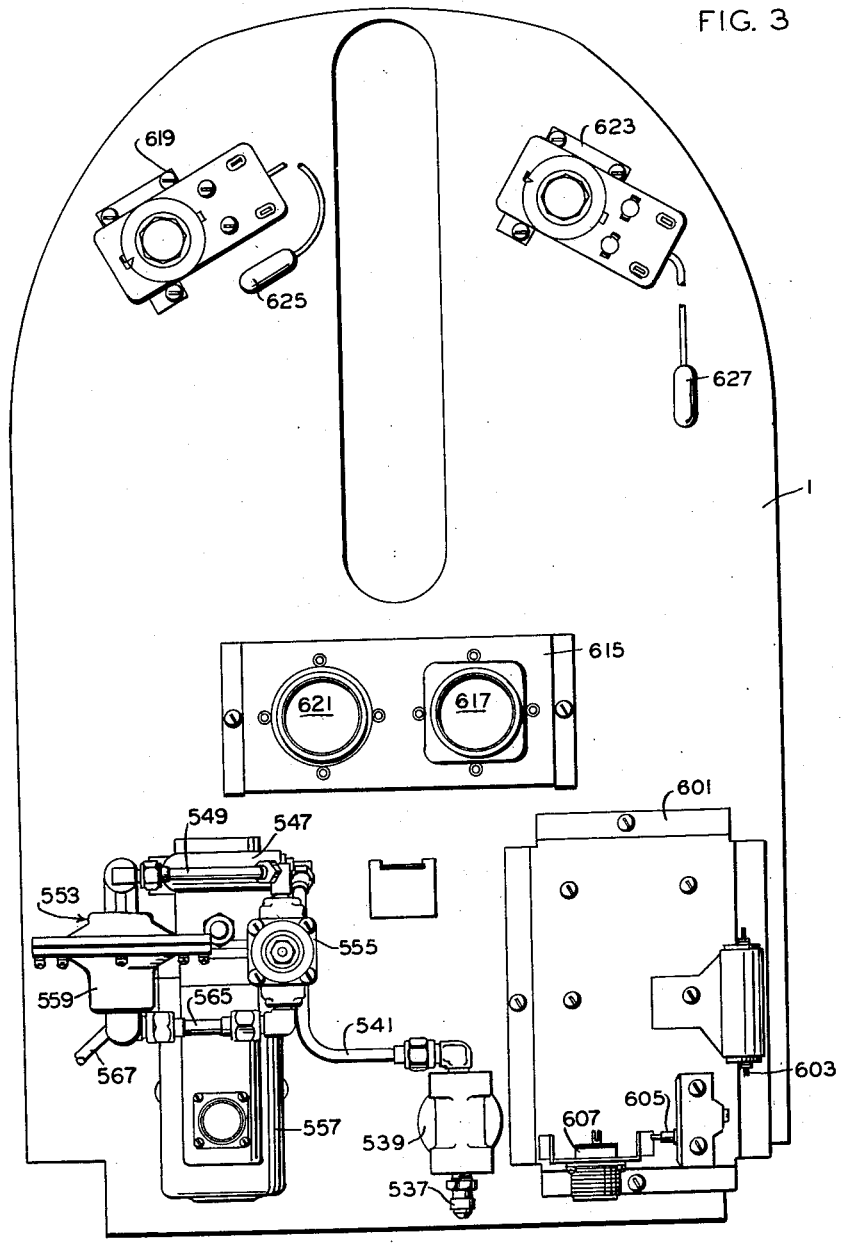

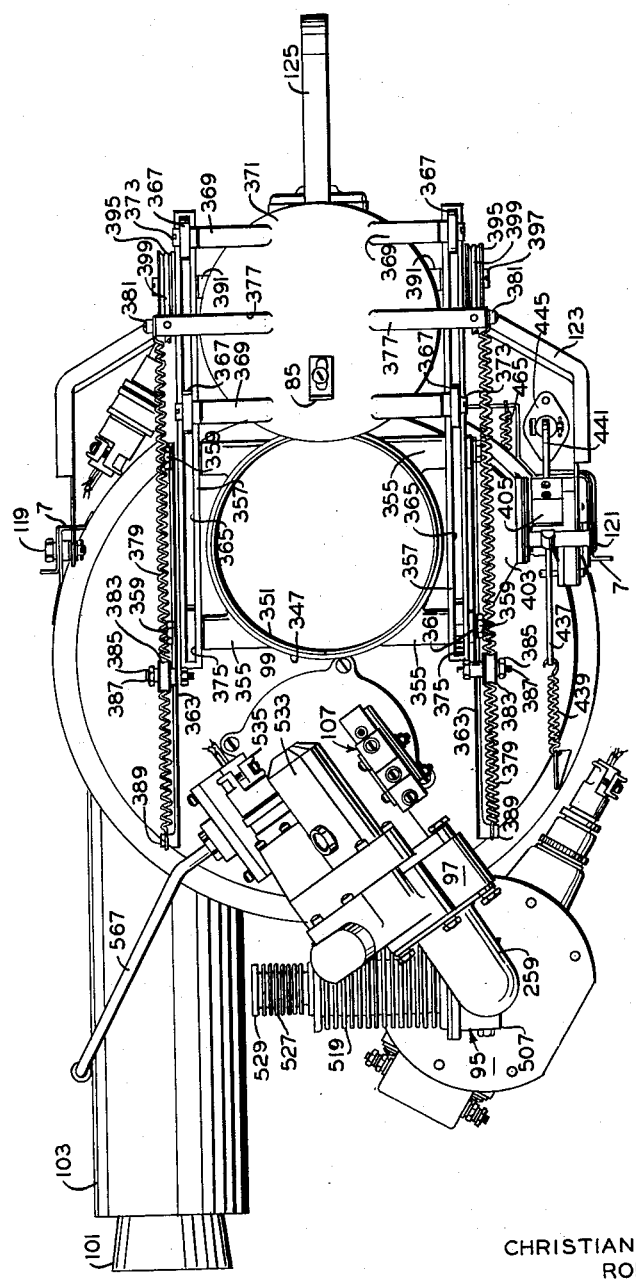

Aug. 8, 1961 C. W. KRUCKEBERG ET AL 2,995,097
INCINERATING TOILET
Filed March 19, 1956 8 Sheets-Sheet 5
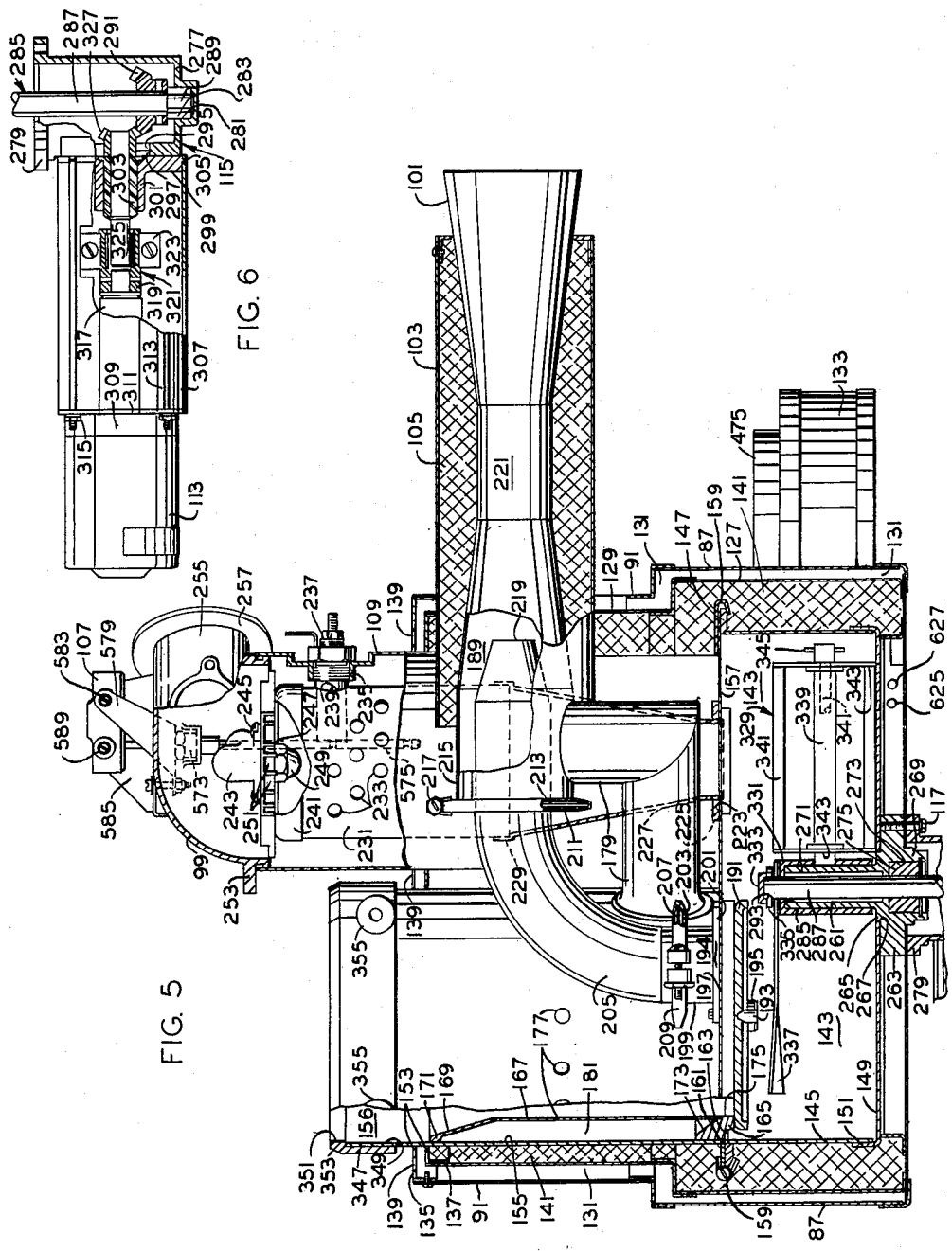
INVENTORS
CHRISTIAN W. KRUCKEBERG
ROBERT J. JAUCH
BY
Edmund W. E. Kamm
ATTORNEY

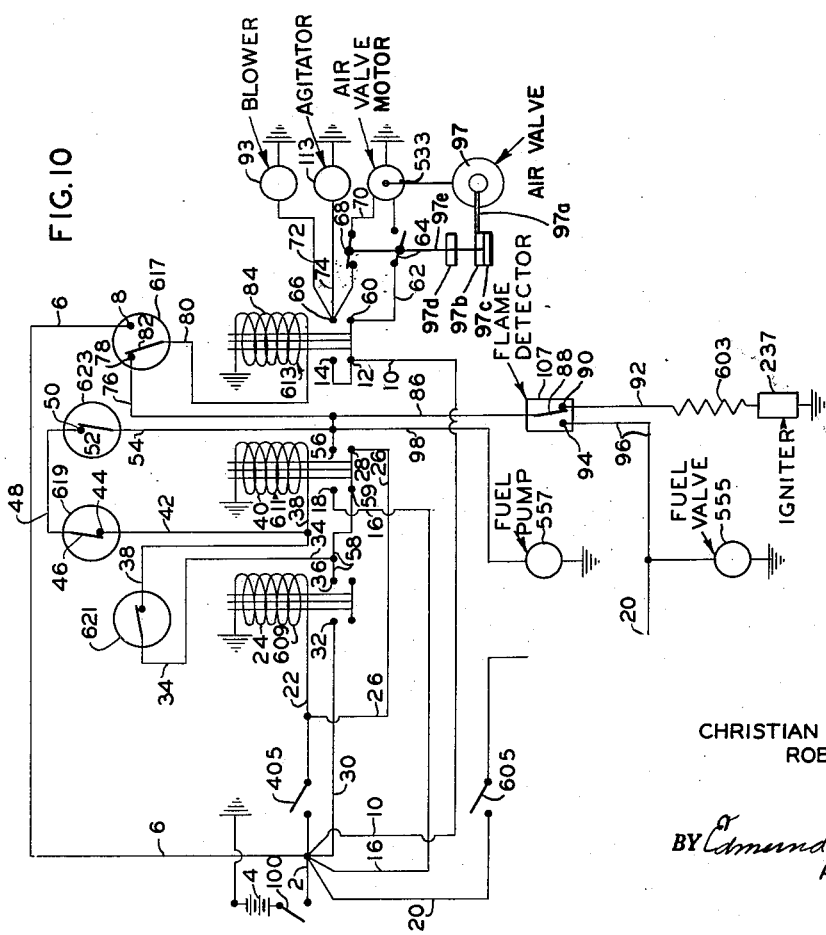
Aug. 8, 1961  C. W. KRUCKEBERG ET AL  2,995,097
INCINERATING TOILET
Filed March 19, 1956  8 Sheets-Sheet 6
CHRISTIAN W. KRUCKEBERG
ROBERT J. JAUCH
INVENTORS
BY Edmund W. E. Kamm
ATTORNEY Aug. 8, 1961 C. W. KRUCKEBERG ET AL 2,995,097
INCINERATING TOILET
Filed March 19, 1956 8 Sheets-Sheet 7

CHRISTIAN W. KRUCKEBERG
ROBERT J. JAUCH
*INVENTORS*

BY *Edmund W. E. Kamm*
ATTORNEY

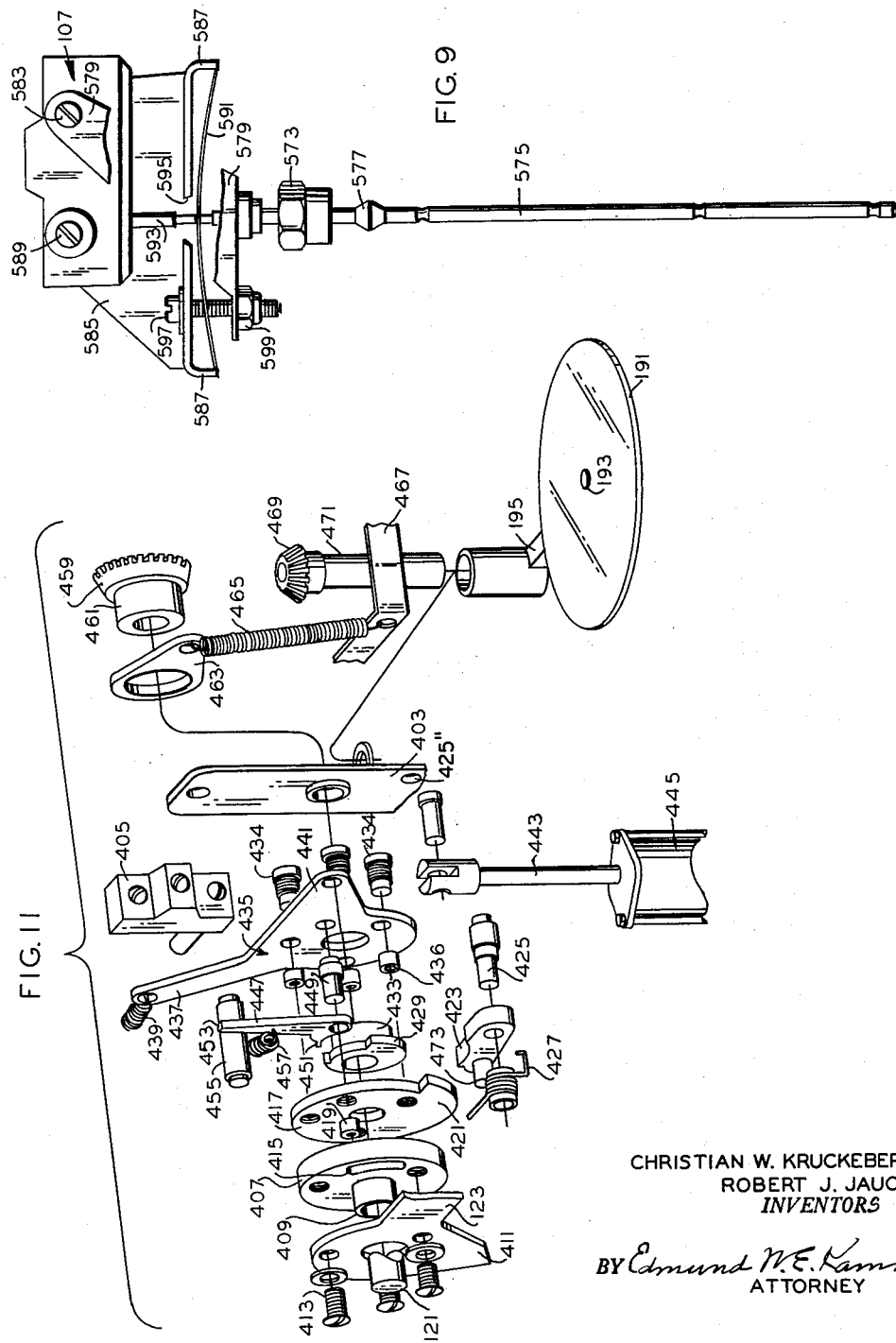

United States Patent Office 2,995,097
Patented Aug. 8, 1961

2,995,097
INCINERATING TOILET
Christian W. Kruckeberg and Robert J. Jauch, Fort Wayne, Ind., assignors to Tokheim Corporation, Fort Wayne, Ind., a corporation of Indiana
Filed Mar. 19, 1956, Ser. No. 572,375
23 Claims. (Cl. 110—9)

This invention relates to an incinerating toilet. More specifically it relates to a toilet of the kind described which is adapted, in one form, for use in aircraft utilizing pressurized cabins and in another form for ground applications such as rail cars, buses, homes, camps, resorts, etc.

In the aircraft application, the electrical system is designed for 24 volt D.C. power and controls are provided to limit the air supplied to the toilet so as to prevent excessive loss of air from the cabin whereas in the ground application, the electrical system is designed for 115 volt A.C. power and the air controls are eliminated.

It is an object of the invention to provide a device which is compact and relatively simple to construct.

Another object of the invention is to provide a control system which will limit the operation of the burner to the minimum time required for the destruction of the charge or charges or to safe temperatures rather than to a fixed time cycle.

A further object of the invention is to provide an incinerating toilet which can be safely used even when a charge is being burned.

Yet another object of the invention is to provide a device which is provided with an intermediate or lock chamber between the incinerator and deposit chambers for receiving the charge during the disposal phase of the cycle, from which the charge is transferred to the incineration chamber to prevent direct communication between the deposit and the incineration chambers.

Another object of the invention is to provide a control circuit which will be conditioned by an operation of the flush lever so that the burning cycle of the hot unit will be started as soon as the unit has cooled to a safe starting temperature.

Still another object of the invention is to provide circuitry which will maintain a flow of cool air to the unit even after the flame has been interrupted so that the unit will cool to a safe starting temperature.

It is yet another object of the invention to provide a yieldable connection between the agitator and its motor to prevent damage to the motor in the event the agitator jams.

A further object of the invention is to provide means for limiting the amount of fuel which can be delivered to the burner nozzle in starting the fire so that in the event the fuel fails to fire, an excess of fuel will not accumulate in the combustion chamber to create an explosion hazard or cause damage by its escape from the unit.

Still another object is to provide a receptacle or deposit chamber comprising two semi-conical elements which are so hinged so that the weight of the charge will open them to discharge the charge into the lock chamber when the cover of that chamber is opened at the top.

A further object of the invention is to provide means on the top door of the lock chamber to control the closure of the semi-conical elements as the top door closes.

It is still another object of the invention to provide means for starting the agitator motor and means for clearing the charge into the combustion chamber.

A further object of the invention is to utilize the combustion products to produce a vacuum which draws air in from the lock chamber to prevent the escape of fumes therefrom.

Still a further object of the invention is to provide a cover for the lock chamber and a mechanism which permits it to seat on and seal the chamber and which causes the cover to lift to clear the top of the chamber when the cover is moved toward its open position.

Another object of the invention is to provide a control mechanism for the starting switch, the lock chamber cover and the lock chamber bottom door so that they will be operated in a predetermined timed sequence.

Yet another object of the invention is to provide means for supplying a limited amount of fuel to the burner nozzle and for thereafter supplying an additional continuous flow of fuel to the nozzle under the control of a flame detector mechanism.

Yet another object of the invention is to provide a manual control for supplying additional increments of fuel to the burner nozzle in the event the fire does not start automatically.

It is another object of the invention to provide means responsive to ambient and blower air pressures for regulating the quantity of air supplied to the burner.

These and other objects will become apparent from a study of this specification and the drawings which are attached hereto, from a part hereof and in which:

FIGURE 2 is a side elevation of the apparatus with the housing removed.

FIGURE 3 is a top view of the base showing the thermostatic controls and the fuel supplying means.

FIGURE 4 is a plan view of the apparatus showing the cover and cover operating mechanism for the lock chamber.

FIGURE 5 is a side elevation of the apparatus with the housings removed and showing the various parts of the structure in section.

FIGURE 6 is an elevation partly in section showing the agitator drive.

FIGURE 7 is an elevation of the air control shown partly in section.

FIGURE 9 is a side elevation of the flame detector and switch.

FIGURE 10 is a wiring diagram of the preferred form of 24 volt D.C. system.

FIGURE 11 is an isometric view of the lower lock chamber door actuating mechanism.

HOUSING AND BASE CONSTRUCTION

Figure 1

Figure 1:
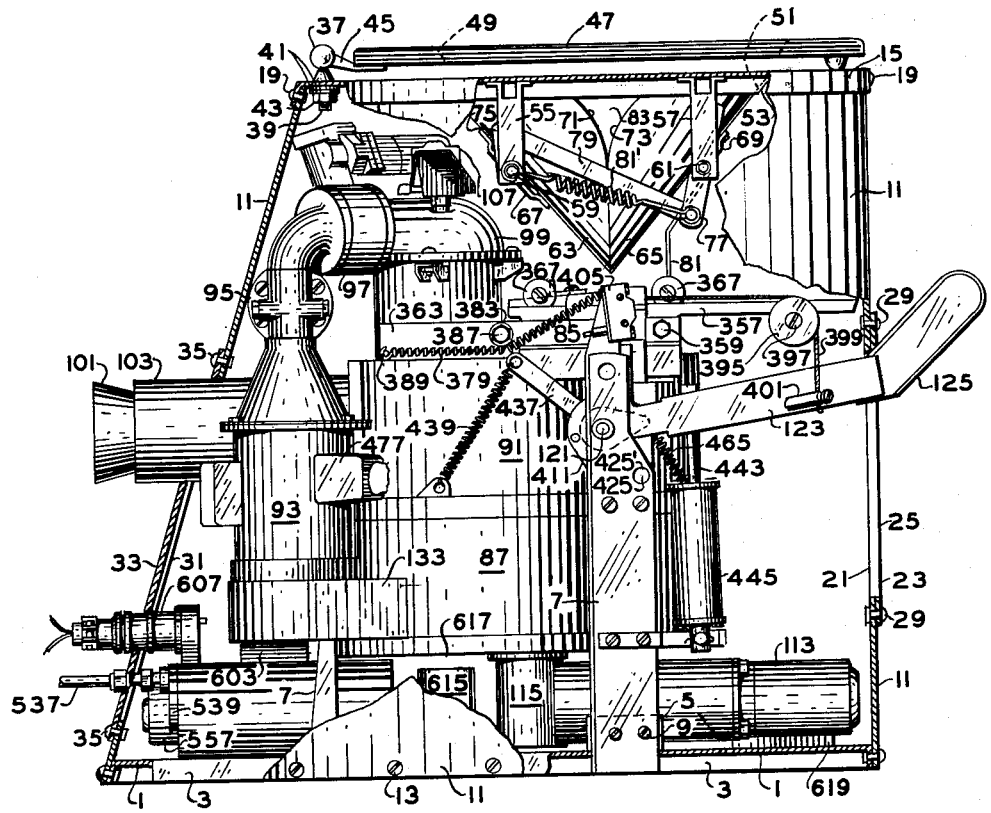
FIGURE 1 is a side elevation of the apparatus in its completely assembled form with parts broken away to show certain mechanisms and the general arrangement of parts.
Figure 13:
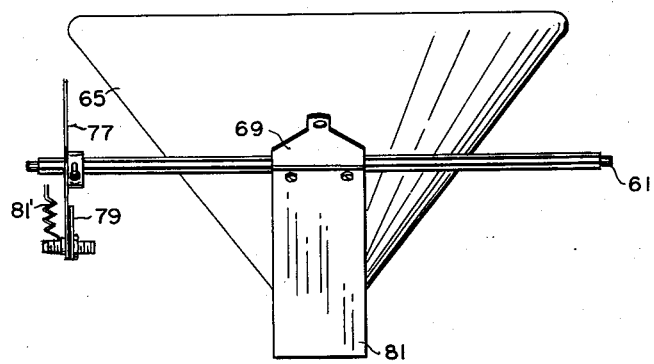
FIGURE 13 is an elevation of the deposit chamber and element operating mechanism.
Figure 14:
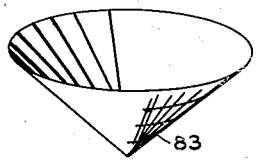
FIGURE 14 is a view of the expendable cup or bag which receives the charge.

Referring to FIGURE 1, the numeral 1 represents a sheet metal base which has a downturned rim or flange 3. Suitable punched up ears 5 are provided to support the lower ends of vertical legs 7 which are fixed to the ears by means of bolts 9.

A sheet metal housing 11 is fixed to the rim 3 by means of bolts 13 and a top plate 15 is fastened to the top of the housing by means of bolts 19.

The front side of the housing is provided with a vertical slot 21, which is provided with an external guide plate 23, having a guide slot 25 through which the operating or foot lever 125 extends. The guide plate is held in place by rivets 29.

An opening 31 is formed in the rear portion of the housing to permit access to the mechanism within the housing. Cover 33 is fitted over the opening and is held thereon by bolts 35.

DEPOSIT RECEPTACLE AND MECHANISM

Figures 1, 13 and 14

A pair of hinge posts 37 have their screw ends 39 inserted through suitable openings in the cover and are held thereon by means of suitable washers 41 and nut 43. The seat 47 has fixed to it a pair of hinge levers 45 each of which is pivotally mounted at one end on a corresponding post 37 and are fixed at the other end to the seat 47.

The seat is provided with an opening 49 and the cover 15 is provided with a corresponding opening 51 which has a downturned conical flange 53 surrounding it. Two rear posts 55 and two front posts 57 are attached to and depend from the cover 15 adjacent the flange 53. Posts 55 support a rotary shaft 59 while the posts 57 support a rotary shaft 61 at their lower ends.

A pair of half cone cup or bag retaining elements 63, 65 are disposed to fit inside and in overlapping relation with respect to the flange 53. The element 63 is mounted by means of a bracket 67 on the shaft 59 while element 65 is mounted by bracket 69 on shaft 61. The cones are cut away at 71, 73 in arcs centered on the shafts 59 and 61 respectively so that the element 63 may rotate clockwise while 65 rotates counterclockwise, each with its associated shaft. These elements form the deposit receptacle or chamber.

A lever 75 is fixed on shaft 59 and extends upwardly therefrom while a lever 77 is fixed on shaft 61 and extends downwardly therefrom. A link 79 connects the levers. A bent arm 81 is fixed to the bracket 69 and depends therefrom for control by a projection 85 (FIG. 4) mounted on the lock chamber cover as described below.

It will thus be seen that when the projection 85 moves toward the right (FIG. 1) to rotate arm 81 counterclockwise to open the cone elements and the weight of the charge will assist the opening of the cone elements and the element 65 will be rotated counterclockwise while element 63 will rotate in a clockwise direction to permit a disposable conical container 83 which rests upon the elements to be discharged downwardly. The levers 75, 77 and link 79 compel the cone elements to move in timed relation and cause them to close when the projection 85 is returned to the left and frees arm 81 for rotation by spring 81' clockwise. Spring 81' is attached at one end to lever 77 and at the other end to shaft 59.

The container is substantially the same size as the cone formed by the elements 63, 65 and is of a readily deformable material such as cellophane or another plastic material. The container will collapse readily due to the weight of its contents and pass through the somewhat narrower opening defined by the elements 63, 65 when they are open.

GENERAL ARRANGEMENT

Figures 2, 4, 5 and 11

Referring now to FIGURES 2 and 5, numeral 87 represents the lower incinerator jacket which is supported on the legs 7 by suitable bolts 89 and on which is mounted the jacket 91 which encloses the lock or intermediate chamber and the burner chamber.

The blower is indicated at 93 and supplies air through the air control valve 95 to the air shutoff valve 97 and thence to the burner chamber cap 99. The exhaust venturi tube 101 is covered by jacket 103 and insulating material 105 is disposed between these elements.

A flame detector switch 107 is mounted on the cap 99 which is fastened to the burner housing 109 by bolts 110 and lugs 111.

The agitator motor 113 and drive 115 are mounted on the bottom of the fire pot by screws 117.

Pivotally mounted on a stud 119 and a shaft 121 described below, supported on the upper ends of the two front legs 7 (FIGURES 4 and 11) is a yoke lever or bail 123 which is formed with a foot lever 125 which extends through the slots 21, 25 of the housing 11 and guide plate 23.

INTERIOR CONSTRUCTION

Figure 5

As shown in FIGURE 5, the jackets 87 and 91 form with the insulation jackets 127, 129 an air space 131 which is connected by a header 133 (FIGS. 1 and 2) with the intake of the blower 93. The outer jacket cover 135 is spaced from the insulation jacket cover 137 to form an air space therebetween which communicates with the space 131 and the outer jacket cover 135 is provided with inlet ports 139 through which ambient air is drawn by the blower and passed through the air spaces to the header 133 to cool the unit before passing to the burner to support fuel combustion.

The insulation 141 may be of any suitable heat insulating material such as asbestos, fire clay, etc.

The combustion chamber 143 is substantially cylindrical and comprises a side wall 145 of heavy sheet steel which is provided with a peripheral ring 147 at its upper end and with a bottom 149 of similar material, which has an upturned flange 151 to receive the lower end of the wall.

Mounted in suitable openings 153, in the top jacket cover 135 and insulation cover is a cylindrical tube 155 which forms a part of the lock or intermediate chamber 156. The tube rests upon the combustion chamber cover 157 which is clamped to the ring 147 by a clamp ring 159. A valve port ring 161 is fitted into the bottom of tube 155 and is provided with a radial flange 163 which rests upon the cover 157 and an axial flange 165 which which projects through a circular opening in cover 157. A drop sleeve 167, having a bell shaped upper end 169 is formed with a radially outwardly directed flange 171 which is slip fitted in the cylinder 155. The bottom end of the sleeve rests on conical surface 173 formed in the upper surface of the port ring. The conical surface merges with a cylindrical port 175 defined by flange 165. Air inlet ports 177 are formed in the sleeve just below the bell portion.

The tube 155 has one end of a draft tube 179 connected to it in communication with the annular space 181 between the cylinder and the sleeve. The other end of the tube 179 communicates with the suction chamber 189 of the exhaust venturi device.

A circular valve 191 is pivotally mounted on a cone ended pin 193 which is supported on one end of a lever 195 which will be described below. The valve will be moved bodily to the right in FIGURE 5 to uncover the port 175 of the lock chamber so that the charge contained in the sleeve 167 of said chamber may fall by gravity into the combustion chamber.

An opening 197 is formed in the combustion chamber cover beside the port ring 161 and a collar 199 having flanges 201, 203 at its ends is fixed by flange 201 to the cover. A nozzle pipe 205 which is formed as an L has a flange 207 resting on flange 203 and a clamp ring 209 holds the flanges in sealing relationship. The nozzle pipe has welded to it a flange 211 which is connected to a flange 213 formed on the end of the venturi tube 215 by means of a clamp ring 217.

The nozzle pipe extends into the tube 215 and terminates in a nozzle 219 which discharges combustion products into the throat 221 of the venturi to create a partial vacuum therein to withdraw gases from pipe 179 described above.

BURNER STRUCTURE

Figure 5

A third opening 223 is formed in the combustion chamber cover which receives a bushing 225 which is counterbored to receive the lower end of the flame nozzle 227. The nozzle is frustoconical in shape and has an axial flange 229 at its wide, upper end for receiving a mixing cylinder 231 which has a number of air inlet ports 233.

The burner housing 109 has a boss 235 at the top thereof which is internally threaded to receive the ignition plug 237 which extends into the mixing cylinder 231 through a suitable lateral opening 239 therein.

A cap 241 is mounted on the upper end of the cylinder 231. The cap carries a fuel inlet fitting 243 which has a threaded inlet adapted to receive the fuel pipe described below. The fitting is held on cap 241 by screws 245 and terminates in a boss 247 which extends into the cylinder 231 and is internally threaded to receive an atomizing nozzle 249. The cap 241 is provided with radially extending vanes 251 which form air passages for conducting air from the cap 99 to the burner to assist in proper mixing of the fuel and air.

The cap 99 is mounted on the burner housing 109 by means of a radial flange 253 which rests upon the end of the cylinder and is engaged by screws 110 (FIG. 2).

The air inlet tube 255 extends laterally from the cap 99. The tube terminates in a flange 257 which connects to the air control valve 97 which in turn connects with the L 259. The latter is connected to the air control 95.

Air enters the cap 99 through the tube 255, from which a part of the air passes radially through the vanes 251 to the interior of the cylinder 231 where it mixes with the atomized fuel and the remainder passes down through the space between the air chamber 109 and the cylinder 231. It enters the cylinder through the ports 233 and becomes mixed with the burning fuel to supply additional oxygen to the flame. The mixture is ignited by the ignition plug 237. The flame is discharged downwardly through the nozzle 227 toward the bottom of the combustion chamber 143.

AGITATOR STRUCTURE

Figures 5, 6

A bearing support 261 has a radial flange 263 and a boss 265 which enters an opening 267 in the bottom of the combustion chamber and is held thereon by screws 117. The support has an axial flange 269 which is bored at 271. The lower end of the support is counterbored at 273 to receive a bearing 275 of the self lubricating type.

A gear box 277 (FIG. 6) has a flange 279 which is attached to the flange 263 by the screws 117. The lower end of the box is provided with a bore 281 which receives a self lubricating bearing 283. A shaft 285 is formed of a hollow tube 287 in the lower end of which is fixed a solid rod 289. A miter gear 291 is fixed to the lower end of the tube 287 and its hub rides on the end of the bearing while the rod enters the bearing. The upper end of the shaft is provided with a pair of bayonet slots 293.

The gear box 277 has a lateral opening 295 which receives the pilot flange 297 of a head 299. The head has an axial boss 301 which receives a self-lubricating bearing 303. The head is provided with a radial flange 305 which receives a cylindrical sleeve 307. A motor 113 has an end bell 309 which is provided with a radial flange 311 which abuts the other end of the sleeve 307. Tie rods 313 screw into the head, pass through the end bell flange 311 and receive nuts 315 to hold the assembly together.

The end bell has an axial boss 317 through which the motor shaft passes. The driving member 319 of an overload clutch 321 is attached to the shaft by means of a pin. The friction driving segments 323 frictionally connect one end of the driving member of the clutch to the driven shaft 325 which is mounted in the bearing 303.

The other end of the shaft carries a miter pinion 327 which meshes with gear 291.

The agitator assembly indicated generally by numeral 329 and comprises a downwardly open sleeve 331 which receives the boss 261 and is provided at its upper end with a hollow cup portion 333 which receives the upper end of the tube 287. A cross pin 335 is inserted in the cup portion and is detachably received in the bayonet slots 293.

An arm 337 is welded to the sleeve 285 at the cap and extends radially therefrom so as to sweep the area under the valve 191 and serves to draw the plastic container into the combustion chamber.

The sleeve has a radially directed shaft 339 on which is rotatably mounted the agitator assembly 329 comprising a pair of end plates 343 which are held together by a number of rods or bars 341. The agitator is free to move axially on the shaft and this movement is limited by the sleeve 285 at one end and a pin 345 mounted through the free end of the shaft.

It will be seen that the agitator will be rotated about the axis of shaft 339 as the latter is driven by said shaft 287 and sleeve 285 and will tend to macerate, mix and spread the charge in the combustion chamber. It will also act to move the charge toward the flame nozzle 227. Portions of the charge will cling to the agitator and will be moved through the flame. The agitator breaks up any encrustations formed by surface drying of the charge and insures that the entire charge is exposed regularly to the flame.

As stated previously, the products of combustion and vapors pass out through the nozzle tube 205 and exhaust tube 101.

LOCK CHAMBER COVER AND ACTUATOR

Figures 2, 4, 5

As shown in FIGURES 2, 4 and 5, the upper end of the lock chamber tube 155 extends above the jacket cover 135 and a collar 347 has a counterbore 349 which receives the upper end of the tube 155, the shoulder formed at the juncture of the bore 351 and counterbore 349 rests on the end of the tube. The upper end of the collar is preferably chamfered at 353.

The collar has a pair of lateral bosses 355 extending from each side thereof. A rail 357 is mounted on each side of the collar by screws 359 supported in the ends of each pair of bosses and extends forwardly therefrom. A spacer 361 is disposed on each screw 359 between the outsides of the rails and a pair of angles 363 which are also supported on the screws and which extend rearwardly from the bosses substantially parallel to the rails.

The rails have grooves 365 formed in their upper faces. These grooves have closed ends and receive the rollers 367 which are mounted on four bosses 369 two of which extend from each side of a cover 371. The rollers are held on the bosses by screws 373. Depressions 375, one for each roller 367, are formed in the bottoms of the grooves to center the cover over the opening in the collar. The depressions also allow the cover to drop down on the end of the collar and seal it to prevent the entrance of air and the escape of fumes.

A projection 377 extends from each side of the cover and is disposed substantially equidistantly from and parallel to the bosses 369.

A spring 379 is attached by a screw 381 to the end of each projection 377. The spring runs under a roller 383 which is attached to angle 363 by means of a nut 385 on a shouldered stud 387. The end of the angle has an upturned ear 389 to which the other end of the spring is attached. The roller is disposed at a lower level than the projections 377 so that the spring applies a downward pull on the cover to hold it in sealing relation on the collar.

A spacer bar 391 (FIG. 4) is mounted between a pair of downwardly extending lugs 393 on the rails near the outer ends thereof and a pulley 395 is mounted on each end of the spacer by means of a shoulder screw 397. A cable 399 on each side of the cover is attached at one end to one of the projections 377 while its other end runs over the associated pulley 395 and runs downwardly to the yoke 123 to which it is attached by means of a stud 401 mounted on the yoke.

Thus as the yoke is depressed by foot lever 125, the cables will draw the cover forwardly. As this occurs, the rollers 367 ride out of the depressions 375 and lift the cover off the collar. The springs 379 yield as the cover is drawn forwardly but contract to return the cover and yoke to the closed position when the lever is released.

The clip 85 mentioned above, is mounted on the cover to actuate lever 81 and the cones of the receptacle to open position as the opening 351 is uncovered and frees lever 81 and the cones for return to their initial position by spring 81' as the door returns to its closed position.

LOWER DOOR OPERATING AND CYCLE START MECHANISM

Figures 2, 4, 5 and 11

Referring to FIGURES 2 and 11, the shaft 121 is mounted on the leg 7 at one end and in a bracket 403 which is mounted on suitable support means (not shown) which is attached to bosses 355. The bracket supports the master control switch 405.

A lost motion element 407 is rotatably mounted on the shaft 121 and has a boss 409 on which the cam 411 which is a part of the flush lever, is rotatably mounted.

The element 407 is fastened on the cam by screws 413 and has an arcuate slot 415.

A latching disc 417 is also rotatably mounted on the shaft 121 and carries a pin 419 which enters the slot 415. The disc 417 also has a tooth 421 which coacts with a pawl 423 which is pivotally mounted on a shaft 425 which is also mounted in the leg 7 at 425' and plate 403 at 425". A spring 427 urges the pawl into engagement with the disc 417.

Ratchet 429 is fixed to the shaft 121 and has a hub 433 on which the lever 435 is rotatably mounted. The disc 417 is attached to lever 435 by screws 434 and spacers 436. The lever has an arm 437 to which is connected a spring or motor 439 and an arm 441 to which is connected the piston rod 443 of a dashpot 445.

A pawl 447 is pivotally mounted on a pin 449 on lever 435. The pawl has a dog 451 which is adapted to engage the ratchet 429 and an upwardly directed trip arm 453 which is adapted to engage a rod 455 which is mounted between the leg 7 and plate 403. The spring 457 urges the dog 451 into engagement with ratchet 429. Shaft 121 has fixed to it a miter gear 459 which carries fixed to its hub 461 a lever 463. A spring or motor 465 is attached to the lever to a bracket 467 on the outer jacket. The gear 459 meshes with a gear 469 on a shaft 471 to which one end of lever 195 is attached. The door 191 which covers the lower end of the lock chamber is mounted on the other end of the lever as described above.

In operation, the yoke or flush lever 123 is depressed after use and the cam 411 and element 407 rotate clockwise (FIGURE 11). The lost motion slot 415 picks up pin 419 so that disc 417 and lever 435 are rotated clockwise. The shaft 121 and the parts fixed to it remain stationary. Arm 437 of lever 435 closes switch 405.

At the end of the stroke, the tooth of ratchet 429 is engaged by the dog 451 of pawl 447 and the disc 417 and lever 435 are held against counter-clockwise rotation by pawl 423 which engages tooth 421, while the flush lever and cam are returned to their initial positions by the springs 379 and cables 399 of the cover 371 to insure that the cover is closed before door 191 is opened. This action is permitted by the lost motion slot 415.

When the cam 411 reaches its initial position, it will contact pin 473 on pawl 423 and release latch pawl 423 from the projection 421 on latch disc 417 whereupon spring 439 will rotate lever disc 435, pawl 447, ratchet 429, shaft 121, lever 463 and gear 459 counter-clockwise under the control of the dash pot 445. Spring 439 overcomes spring 465 in the process. Gear 459 rotates gear 469, shaft 471 and lever 195 to open the door 191.

As the lever 435 approaches its initial position, the trip arm 453 strikes rod 455 and pulls dog 451 out of the ratchet 429 to free the shaft 121. Thereupon the spring 465 returns the shaft 121, gear 459 and the associated parts to their initial positions closing door 191.

AIR SUPPLY SYSTEM AND CONTROLS

Figures 2, 4, 5 and 7

As indicated above, the combustion air is drawn in through ports 139 (FIG. 5) in the jacket covers 135, passes all around the various chambers which are heated during operation and passes to the header 133.

The header has an upwardly directed collar 475 (FIGS. 2 and 5) which sealingly receives one end of the blower 93. The blower is preferably a self contained motor and axial flow fan which has a capacity of about 27 c.f.m. of air and which is supplied with a power connection 477. The top flange of the blower has a reducing connection 479 which leads to the air control valve 95 shown in detail in FIGURE 7.

As shown therein the valve comprises a body 481 having a bore 483 in which is disposed a butterfly valve 485 having a diametrically disposed shaft 487, the ends of which are mounted in bearings 489 screwed into the body.

An ear 491 extends from the valve and perpendicular thereto on one side of the shaft. The ear is received in the slot 493 of the bifurcated control rod 495 and a pivot pin 497 is passed through the rod and ear to pivotally connect them.

The body 481 is provided with an opening 499 through which the rod passes. The openings is circumscribed by two axially extending flanges 501, 503 and the outer flange has a groove 505 disposed adjacent to it which is defined outwardly by a peripheral flange 507. An O-ring gasket 509 is seated in the groove.

A cylindrical bearing member 511 has a radial flange 513 which rests upon the flanges 501, 503. The bearing member has bearings 515 and 517 at its bottom and top ends respectively to guide the rod 495.

A bellows 519 has a radial flange 521 which rests on flange 507 and O-ring 509. The upper end of the bellows is provided with a head 523 which is perforated at 525 to pass the control rod. A second bellows 527 is fixed to the top of the head. The cover 529 of the second bellows is provided with downwardly extending boss 531 into which the upper end of the control rod is screwed.

The object of the valve is to increase the port opening as the pressure on the outside of the bellows decreases. Under this condition, air under blower pressure passes to the interior of the bellows through slot 493 and through bores 515, 517 and 525 and tends to expand them and open the valve as shown in FIGURE 7. As the pressure surrounding the bellows increases, the bellows contract and rod 495 moves toward the valve to close it. Thus as the intake air becomes more dense, a smaller volume is fed to the burner so that the fuel-air ratio at the burner will not vary excessively. This unit is especially necessary when the aircraft cabin is not pressurized, in which case as the ambient air rarifies with increased altitude the pressure outside of the bellows falls and the valve is opened to compensate for the reduced density.

The valve 97 is preferably a gate valve which is operated by a motor 533 and a gear set (not shown) to its open and closed positions which are determined by suitable upper and lower limit switches 68 and 64 respectively. As shown in FIGURE 10, the reversible motor 533 drives the valve 97 and an arm 97a which moves with the valve. The arm is provided with a yoke 97b which spans rod 97c. The rod connects the limit switches 68 and 64 so that when the rod moves in one direction it closes switch 68 and opens 64 and when it moves in the opposite direction it opens 68 and closes 64. Stops 97c and 97d are fixed to the rod on opposite sides of the yoke and are respectively engaged thereby near the end of the travel of the yoke in opposite directions to move the rod in corresponding directions to actuate the limit switches. The electrical fitting for supplying power to motor 533 is shown at 535 (FIG. 4). The valve 97 is open only when the cycle is to be started or is in progress and is closed at all other times to prevent loss of cabin air during such times.

Loss of any appreciable quantity of cabin air through the exhaust tube 101 is prevented by the cover 371. Air entering ports 139 is controlled by valve 97 just described. A slight loss is helpful in that it prevents odors from escaping from the apparatus, so that valve 97 need not provide a perfect seal.

FUEL SUPPLY SYSTEM

FIGURES 1, 3, 4, 8 and 12

Figure 8:
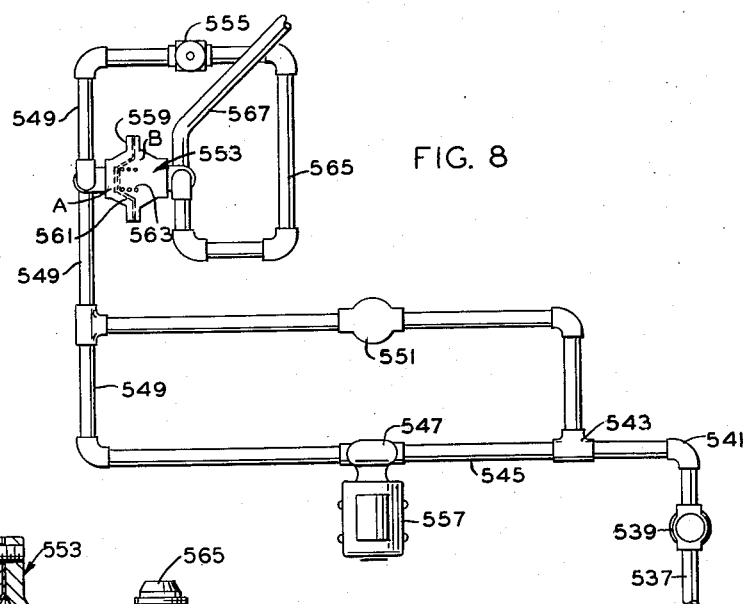
FIGURE 8 is a schematic view of the fuel system.

Referring to FIGURES 1, 3 and 8, the pipe 537 is connected at one end to the fuel supply tank (not shown) and at the other end to a filter 539 which is in turn connected through line 541, T 543 and line 545 to the suction side of a positive displacement pump 547. The discharge side of the pump is connected to a discharge line 549 which is connected in turn to a bypass valve 551, a fuel safety stop 553 and a solenoid valve 555. An electric motor 557 mounted on the base 1 drives the pump which is preferably supported on and integral with the motor.

The discharge of the bypass valve is connected to the suction line at T 543 so that it may circulate liquid through the pump in the event the discharge pressure becomes excessive.

The safety stop comprises a body 559 which is divided by a diaphragm 561 into two chambers A and B and a compression spring 563 is disposed in chamber B to urge the diaphragm in a direction to contract chamber A which has open communication with line 549.

Solenoid valve 555 discharges through pipe 565 to the other end of the body 559 in communication with the chamber B and the pipe 567 leading to the nozzle 249.

The object of this system is to provide first, by means of the fuel stop 553 a limited discharge of fuel to start the flame and thereafter, if combustion starts, provide a continuous flow through the solenoid valve 555. However, if combustion does not start, no more fuel will flow to the burner other than that contained in the fuel stop.

Figure 12:
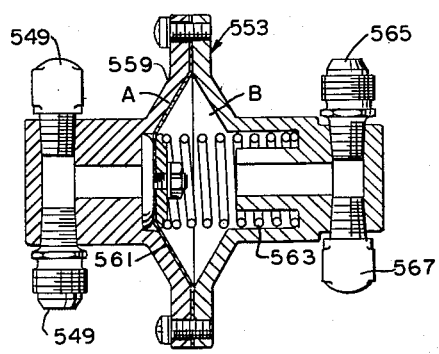
FIGURE 12 is an elevation in section of the fuel stop.

Assuming that the pump is at rest and valve 555 is closed, the diaphragm 561 will occupy the position shown in FIGURES 8 and 12. When the pump 547 starts, the pressure in line 549 will rise and, since valve 555 is closed, the diaphragm will be displaced to the right and fuel will be discharged from chamber B through the fuel line 567 to the burner nozzle. If the flame starts, a mechanism described below will energize the solenoid of valve 555 to open the valve. The pressure on opposite sides of the diaphragm will now become equalized and the spring 563 will move the diaphragm to the left and chamber B will refill for the next starting cycle. The liquid in chamber A will pass back into line 549.

The situation which occurs when the fire does not start will be explained below, but in such case only the fuel contained in chamber B can be supplied to the burner nozzle automatically and will drain into the fire pot to be later consumed.

FLAME DETECTOR

FIGURES 2, 4, 5 and 9

Referring to FIGURES 2, 5 and 9, a threaded boss 571 is formed on the cap 99 and is tapped to receive the fitting 573. A flame responsive sensing element 575, which is preferably a quartz rod, is mounted in the fitting by means of a ferrule 577 and a nut which forms a part of the fitting.

A bracket 579 is mounted on the sensing element and a single pole double throw switch 107 is mounted on the bracket by means of the bolt 583. This switch when cold has one set of contacts open and another set will be normally closed as will be explained below.

A spring support 585 which has downturned ears 587 is pivotally mounted on the bolt 589 and an upwardly bowed spring member 591 has its ends confined between the ears.

The switch actuator 593 has one end extending through a hole 595 in the support so that it may be urged into contact with spring 591 by means of a mechanism (not shown) in the switch. A bolt 597 is rotatably mounted through holes in the bracket and support. By rotating the nut 599, the support is pivoted about bolt 589 so that it will vary the length of the actuator 593 which extends out of the switch and therefore will vary the amount of increase in length of the sensing element 575 required to move the switch to close the first mentioned contacts and to open the normally closed set.

The lower end of the sensing element is disposed to extend into the space between housing 109 and the cylinder 231 and will be subjected to the heat of the burner. As it becomes heated, the rod will expand. The upper end of the rod will act on the spring 591 to actuate the switch through actuator 593. The switch has its normally closed pair of contacts connected to energize the ignition plug 237 and the normally open pair connected to energize the solenoid valve 555 and open it so that fuel may continue to flow from the pump to the burner nozzle. The circuit controlled by the switch will be described below in connection with the wiring diagram.

ELECTRICAL AND CONTROL SYSTEM

Figures 3, 4 and 5

Referring to FIGURE 3, a relay box 601 is mounted on the top side of base 1. Mounted on top of the box is a resistor 603, a reset switch 605 and an electrical fitting 607. Relays 609, 611 and 613 are mounted in the box.

A bracket 615 is also attached to the top side of the base for supporting a pair of thermostatic switches 617, 621 in closely spaced relation with respect to the bottom of the combustion chamber.

A pair of bulb type, adjustable thermostatic switches 619, 623 are attached to the top side of the base at the front thereof and the bulbs 625, 627 thereof are mounted directly below the combustion chamber as shown in FIGURE 5.

The master switch 405 is mounted for operation by the flush mechanism as described above.

WIRING DIAGRAM

Figure 10

By supplying electrical equipment of the proper specifications the apparatus may be operated on the available power supply. In aircraft, the electrical components are selected for use on 24 volt D.C. current whereas the units intended for use on ground installation are supplied with components rated for 110 v. A.C.

The diagram of FIGURE 10 is for a 24–27 volt D.C. power supply in which the burner cycle is controlled by thermostats as distinguished from a motor controlled timer.

The wire 2 is connected to a source of electric energy such as a battery 4 through a main switch 100. The battery has one side connected to the ground. The line 2 is connected by wire 6 to one terminal 8 of the blower control thermostat 617. Another line 10 is connected to wire 2 at one end and to a contact 12 of the relay 613 which has a second contact 14 connected to contact 12. Another wire 16 is connected at one end to wire 2 and at the other end to contact 18 of relay 611. Still another wire 20 is connected to line 2 at one end and through the reset switch 605 to the fuel valve 555 and to ground. The master switch 405 has one pole connected to the wire 2 and the other by wire 22 to the coil 24 of relay 609 the other side of which is grounded. A line 26 connects wire 22 with the contact 28 of the relay 611.

Wire 30 is connected at one end to the wire 2 and to contact 32 of relay 609.

One side of the starting control thermostatic switch 621 is connected by wire 34 to the contact 36 of relay 609. The other side of the switch is connected by a wire 38 to the coil 40 of relay 611. The other side of the coil is grounded. The input side of this coil is connected by wire 42 to one pole 44 of the safety cut-off temperature control thermostatic switch 619. The other pole 46 of the switch is connected by a wire 48 to one pole 50 of the high cut off temperature thermostatic switch 623. The other pole 52 of the switch is connected by wire 54 to contact 56 of relay 611.

A line 58 connects contact 36 of relay 609 to contact 59 of relay 611.

Contact 60 of relay 613 is connected by wire 62 through one limit switch 64 to one terminal of the motor 533 of air valve 97.

Another contact 66 of the same relay is connected through the other limit switch 68 to a second terminal of the air valve motor by wire 70. The air valve motor is also grounded. This motor is a reversible motor and is operated to close the valve when contact 60 is energized and operated to open the valve when contact 66 is closed. The motor, as stated above, includes built in limit switches 64 and 68 which open the energized circuit 62 or 70 when the valve has fully closed or opened and the switch which opens is connected mechanically to close the opposite limit switch for a succeeding operation.

Contact 66 is also connected by wire 72 to the motor of the blower 93 which is grounded and by wire 74 to the agitator motor 113 which is also grounded.

A wire 76 connects the other contact 78 of switch 617 with contact 56 of solenoid 611. Another wire 80 connects the blade 82 of this switch to the coil 84 of relay 613, the other end of which is grounded.

The contact 56 is connected by wire 86 to the blade 88 of the flame detector switch 107. One contact 90 of that switch is connected by wire 92 to the resistance 603 and igniter 237 which is in series therewith and through the igniter to ground. The other contact 94 is connected by wire 96 to the solenoid of the fuel valve 555 and to ground. A line 98 connects contact 56 of solenoid 611 with the motor 557 of the fuel pump 547 which is grounded.

Switch 405 is normally open as are the contacts 32 and 36 of solenoid 609; contacts 18 and 56 of solenoid 611; contacts 14 and 66 of relay 613; contacts 8—82 of the blower control thermostat 617; contact 94 of the flame detector switch 107 and the reset switch 605.

Switches 619, 621, 623, 88—90 and 78—82 are normally closed when the unit is ready to operate.

ELECTRIC SYSTEM—OPERATION

Assuming that the unit is cold and that it occupies its rest condition. Switches 621, 44—46, 50—52, 78—82, 59—28, 12—60, 88—90 are all closed. The master control switch 405 is now closed momentarily as the result of the actuation of the flush lever and its associated mechanism to start the cycle and, by its closure, it energizes solenoid 609 which closes contacts 32—36. These, with contacts 59—28 of solenoid 611, form a holding circuit C from the main 2 through line 30, contacts 32—36, contacts 59—28, lines 26, 22 and coil 24 of solenoid 609 to ground. Thus the cycle is conditioned to start whenever the temperature conditions of the device will permit.

If the unit is cool enough to warrant a cycle, switch 621 is closed and the holding circuit will be immediately interrupted because solenoid 611 will be energized upon closure of contacts 32—36, through the initiating temperature switch 621 and wires 34 and 38. The contacts 32—36 are therefore opened when contacts 59—28 open and solenoid 609 becomes deenergized. Contacts 18—56 of solenoid 611 are closed upon energization of 611. In the event the unit has not cooled sufficiently to permit another cycle, the switch 621 will be open and solenoid 609 will be held energized by the holding circuit until switch 621 cools sufficiently to close.

When contacts 18—56 of solenoid 611 are closed, power is supplied directly from line 2 through line 16 to contact 18 and thence to contact 56, switches 52—50, 46—44 to the coil 40 to hold the solenoid 611 energized. Current will therefore flow from contact 56 through line 76, switch 78—82, line 80 and coil 84 to energize relay 613 which opens contacts 12—60 and close contacts 14—66.

Contact 66 is thus fed directly from line 2 through line 10 and contacts 12 and 14 which are bridged. The blower motor 93 will thus be energized through line 72, which is connected to contact 66, agitator motor 113 will be energized through line 74 and the air valve motor 533 will be energized through line 70 and the closed limit switch 68 to open the air valve. When valve 533 is open, the upper limit switch 68 will open and the motor will stop. The movement of the upper limit switch is transmitted through a suitable connection to the lower limit switch 64 which will thus be closed.

Also deriving energy from contact 56 through line 98 is the fuel pump motor 557. It will be noted that the solenoid of the fuel valve 555 is deenergized so that the only effect of the pump is to displace the diaphragm 561 of the fuel safety stop to the right (FIG. 8) and discharge the limited amount of fuel in the chamber B thereof to the fuel nozzle which sprays it into the combustion chamber along with the air supplied by the blower 93 for a predetermined period of time.

The contact 56 is also connected by line 86 through the switch 88—90, line 92, resistor 603 and igniter 237 to ground. Thus the igniter will be conditioned to ignite the air-fuel mixture and if this occurs within the period during which fuel is supplied by the fuel safety stop, the sensing element of the flame detector will become heated and will shift to close contacts 88—94 to establish the circuit which opens the fuel valve 555 and thus provides a continuing supply of fuel to the burner while at the same time opening contacts 88—90 to deenergize the igniter.

Assuming that the flame starts, the thermostatic switches 621 and 617, which are spaced from the bottom of the combustion chamber and are adapted to open at about 320° F. and 290° F. respectively, begin to heat as do the bulbs of the thermostats 619 and 623 which are set at about 350° F. and 370° F. respectively. When the thermostat 617 heats to about 290° F. its switch 78—82 opens and switch 8—82 closes. This places the solenoid coil 84 in direct circuit with the main 2 through line 6 and switch 8—82 and therefore the blower 93 and agitator motor 113 will continue to run and the air valve will remain open even when solenoid 611 is deenergized breaking the power supply to contact 56.

As the charge is being burned the bulb temperature of thermostat 619 usually does not exceed the 350° F. temperature for which it is set. This is probably due to the fact that the continued evaporation of the fluid content of the charge prevents the rise of temperature. However, when combustion is substantially complete, the bulb temperature rises and the switch 44—46 opens. The switch 50—52 is provided as a safety measure and would operate at a higher temperature (i.e. 370° F.) in the event that switch 619 failed to operate at its assigned temperature.

When either of these switches has opened, the relay 611 is deenergized and contacts 18—56 are broken while contacts 59—28 are reestablished.

Since contact 56 is not now live, the fuel pump motor 557 and the solenoid of the fuel valve 555 will be deenergized and the flame fails. Flame detector switch 107 resets to close contacts 88—90 and opens contacts 88—94 for a succeeding cycle.

As noted above the blower and agitator continue to operate with the air valve open until thermostat 617 cools to the point that switch 8—82 opens and 78—82 closes. The blower during its continued operation, cools the unit and carries ash, which is entrained in the air stream from the blower by the continuing operation of the agitator, out the exhaust tube 101.

The thermostat 621, like 617 is not in actual contact with the combustion chamber or fire pot and is therefore operable at a temperature which is relative to but lower than the fire pot temperature.

Being set at 320 degrees, thermostatic switch 621 will open at that temperature and will prevent the repeating of the above described cycle until the unit has cooled sufficiently to reclose 621. This is true because with switch 621 open, the relay 611 cannot be energized by the operation of the master switch 405 and contacts 32—36.

On the other hand, when this thermostatic switch remains above the set temperature and is therefore open, and when the relay 611 is deenergized due to the thermostat 619 or 623, an operation of the master switch, which indicates the need for a new cycle, will set up the holding circuit for relay 611 so that as soon as the open thermostat recloses, the relay 611 will be again energized to restart the cycle after which relay 609 is again deenergized as explained above. It will be seen that so long as there is a charge in the incinerator which needs to be consumed, the device will recycle until consumption is completed.

In the event the flame does not start when a cycle is required, the fuel safety stop will be emptied within the predetermined period of time and no further fuel can be supplied to the safety stop or nozzle, regardless of the fact that the pump motor 557 is operating, because the fuel valve 555 remains closed. There can thus be no danger from the sudden igniting of a large quantity of fuel which might otherwise accumulate in the combustion chamber.

Since the normally open reset switch 605 provides power directly from the main line 2 to the fuel valve solenoid through line 20, momentary manual closure of this switch will supply fuel directly from the pump to the fuel nozzle and will recharge the safety stop chamber B. If ignition does not occur shortly after closure of the reset switch, the device should be checked to determine the trouble.

In the event the flame does not start, it will be advisable to restore the controls to normal. This can be done by opening the main switch 100, which supplies power to line 2, after the blower has cooled the unit sufficiently to reclose switch 78—80, so as to deenergize all of the relays. The main switch 100 should again be closed so that the solenoid 613 which now has closed contacts 12—60 may reenergize the air valve motor 533 in a valve closing direction until the lower limit switch 64 opens and simultaneously closes the upper limit switch 68. Failure to close this valve as just described would result in excessive loss of air from a pressurized cabin.

GENERAL OPERATION

Assuming that the apparatus is in condition for a cycle and that the user has depressed the flush lever 125, it will be seen that the downward operation of the lever will have pulled the cover 371 forwardly and the clip 85 thereon will have actuated lever 81 to open the bag retaining elements 63, 65 so that the charge will drop by gravity into the intermediate or lock chamber 156 onto door 191. At the same time the latch pawl 451 will have engaged the ratchet 429 on the shaft 121, pawl 423 will be in engagement with tooth 421 and the arm 437 will have closed the switch 405.

The flush lever, when released, will be drawn back to its original position as will the cover 371 by the springs 379. The cover seats on collar 347 and intermediate chamber is thus closed and sealed. When the lever 125 approaches its initial position, the cam 411 trips the latch 423 so that the spring 439 will rotate the lever 435, pawl 447 and ratchet 429 which will rotate shaft 121 in a counter-clockwise direction (FIG. 11). The shaft 121, lever 463, gears 459, 469, lever 195 and door 191 are actuated to open the bottom end of the intermediate chamber so that the charge may drop into the combustion chamber. Spring 465 is cocked.

Meanwhile the switch 405 has started the cycle and the burner is in operation. The rotation of the blade 337 sweeps the opening from the chamber 156 and insures that the charge and the bag or cup containing it are in the combustion chamber 143. The dash pot 445 slows the opening phase of the door cycle to insure time for the charge to clear the opening and to be fully drawn into the combustion chamber by the arm 337.

When the lever 447 strikes its stop rod 455 the pawl 451 releases the ratchet 429 and spring 465 moves shaft 121 and the parts driven by it in the door closing direction until they return to their initial position to cause door 191 to again close the lock chamber.

The agitator 329 macerates the charge, breaking up any crust formations and presenting fresh portions of the charge to the flame. Any liquid in the charge is evaporated as is the liquid content of the solid material and the solid matter is incinerated to ashes.

When the charge has been consumer, the temperature of the fire pot rises and the thermostat 619 opens the circuitry to stop the fuel pump and close the fuel valve. The blower continues to run with the air valve open until the thermostat 617 cools enough to stop it by breaking contacts 8—82 so that the air valve closes as described above.

During incineration, air is drawn in through the inlet ports 139, down through the space between the jackets through the blower and into the burner chamber where it unites with the fuel to produce the flame which is projected into the combustion chamber. The amount of air forced into the burner by the blower is regulated by the valve 95 in proportion to the differential of the pressures in the cabin and the pressure created by the blower. From the combustion chamber, the gases and steam pass through the nozzle pipe 205 and nozzle 219 into the venturi near the throat 221 creating a partial vacuum in chamber 189. This vacuum is applied to the intermediate chamber 156 to prevent the escape of gases therefrom. The cover 371 sets down on the collar 347 and closes it snugly to further insure against the escape of gases.

Should the apparatus be used again while any of the thermostats 619, 621 or 623 are open, the charge will be delivered to the combustion chamber (the arm 337 being in operation at the time) and switch 405 conditions the holding circuit C for a subsequent burning cycle when the thermostats cool sufficiently to permit another cycle.

Should the flame fail to start, the reset switch may be manually operated one or more times to supply additional fuel in an effort to start it.

The fuel pump is capable of supplying about 30 g.p.h. at about 20 p.s.i. The agitator is driven at about 50 r.p.m. and in the event, it becomes jammed, friction clutch 321 will slip to prevent burning out the motor 113. The safety fuel stop provides fuel for about 30 seconds of operation while the flame detector switch operates after about 20 seconds of combustion.

GROUND APPARATUS

As stated above, in ground installations the problem of bleeding high pressure cabin air to the vent, which is at a lower pressure, does not exist.

Accordingly, the control valve 95 and the air valve 97 with the associated circuitry may be omitted. Such a unit may be operated from an alternating source of electricity but since it requires merely ordinary skill to choose the proper types of motors, switches and wiring, it is not believed to be necessary to burden this specification with a full disclosure of same.

It is also believed that the substitution of a spark ignition system instead of a glow plug system as contemplated by this specification is so obvious that further explanation is not necessary.

The use of various fuels such as gasoline and various grades of fuel oil is also contemplated and while the different fuels may require some adjustments in the mechanism such as the size of the fuel nozzle, the by-pass pressure of the fuel, or the temperature settings of the various thermostats particularly 619 and 623 which limit the maximum temperatures, these adjustments are a matter of ordinary skill and it is believed not to be necessary to go into them in detail. The thermostats 619 and 623 have manually adjustable knobs which may be used to alter their temperature settings.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires protection falling fairly within the scope of the appended claims.

We claim:

1. In an incinerating device, the combination of means defining a combustion chamber, a lock chamber, means defining a first opening and connecting said chamber and means defining a top opening in said lock chamber, a door mounted for movement to and from closed position over said first opening, a cover mounted for movement to and from closed position over said top opening, manually controlled means operable in a first phase for moving said cover away from and in a second phase for returning it to closed position, and additional means controlled by said last named means for moving said door from and returning it to closed position after said cover has returned to its closed position.

2. In an incinerating device the combination of means defining a combustion chamber, a lock chamber, means defining a first opening and connecting said chambers and means defining a top opening in said lock chamber, a door mounted for movement to and from closed position over said first opening, a cover mounted for movement to and from closed position over said top opening, manually controlled means operable in a first phase for moving said cover away from and in a second phase for returning it to closed position, and additional means controlled by said last named means for moving said door from and returning it to closed position after said cover has returned to its closed position, said means for moving said door comprising a motor connected to be conditioned for operation by said cover moving means during said first phase, releasable means for holding said motor conditioned, means operable by said cover moving means at the end of said second phase for releasing said holding means, said motor being operable thereupon to open said door and additional actuatable means for reclosing said door.

3. In an incinerating device the combination of means defining a combustion chamber, a lock chamber, means defining a first opening and connecting said chambers and means defining a top opening in said lock chamber, a door mounted for movement to and from closed position over said first opening, a cover mounted for movement to and from closed position over said top opening, manually controlled means operable in a first phase for moving said cover away from and in a second phase for returning it to closed position, and additional means controlled by said last named means for moving said door from and returning it to closed position after said cover has returned to its closed position, said means for moving said door comprising a motor connected to be conditioned for operation by said cover moving means during said first phase, releasable means for holding said motor conditioned, means operable by said cover moving means at the end of said second phase for releasing said holding means, said motor being operable thereupon to open said door and additional actuatable means for reclosing said door comprising a second motor connected to be conditioned for actuation during the operation of first motor and means operable at the end of operation of said first motor for causing actuation of said second motor to close said door.

4. In an incinerating device, the the combination of means defining a combustion chamber, a lock chamber, means defining a first opening and connecting said chambers and means defining a top opening in said lock chamber, a door mounted for movement to and from closed position over said first opening, a cover mounted for movement to and from closed position over said top opening, manually controlled means operable in a first phase for moving said cover away from and in a second phase for returning it to closed position, and additional means controlled by said last named means for moving said door from and returning it to closed position after said cover has returned to its closed position, flame producing means associated with said combustion chamber and operable in a cycle comprising flame starting and maintaining vents, means operable to initiate said cycle, means operable by said cover moving means for operating said cycle initiating means near the completion of said first phase.

5. In an incinerating device, the combination of means defining a combustion chamber, a lock chamber, means defining a first opening and connecting said chambers and means defining a top opening in said lock chamber, a door mounted for movement to and from closed position over said first opening, a cover mounted for movement to and from closed position over said top opening, means including a manually operable first lever for moving the cover away from and returning it to closed position, a shaft mounted for rotation and connected to operate said door, a second lever rotatably mounted on said shaft, a spring connected to actuate said lever, a ratchet fixed to the shaft, a pawl on the lever adapted to engage said ratchet, means connecting said first lever to rotate said second lever in a direction to stress said spring and to a position to engage said pawl and ratchet, a releasable stop means for holding said lever in said position, means operable by said first lever, when the cover has closed, for releasing said stop means, said second lever, spring and pawl serving to rotate said ratchet and shaft to open said door and means for disengaging the pawl and ratchet when said door is opened.

6. The structure defined by claim 5 including a third lever fixed to the shaft, a second spring connected to the lever so as to rotate the shaft in a door closing direction, said second spring being weaker than the first so that it will be stressed thereby as the door is opened and being effective when the pawl and ratchet are disengaged to rotate said shaft to close the door.

7. In an incinerating device, the combination of means defining a combustion chamber, a lock chamber, means defining an opening and connecting said chambers, and means defining a top opening for said lock chamber, a door and a cover for said respective openings, a flame generator disposed to discharge flame into said combustion chamber, means including a blower for forcing air under pressure to said generator and combustion chamber, a combustion products discharge pipe connected to said combustion chamber and terminating in a nozzle, a venturi pipe having a throat disposed to receive the jet formed by said nozzle, and an exhaust pipe connecting said venturi pipe in communication with said lock chamber for creating a partial vacuum therein to prevent the escape of gases therefrom.

8. In an incinerating device, the combination of means defining a combustion chamber and a lock chamber, said means including substantially planar means defining an opening and connecting said chambers and disposed immediately adjacent said combustion chamber, a door for said opening, means for opening and closing said door to deposit a charge in said combustion chamber, a motor, a shaft driven by the motor and extending into said combustion chamber and an arm on said shaft, disposed so as to travel in a path closely adjacent to said door and substantially parallel to said planar means, means for controlling the operation of said door and said arm so that the arm will sweep the space below said opening while said door is open, to draw the charge into the combustion chamber prior to closure of the door.

9. In an incinerating device, the combination of means defining a combustion chamber, a fuel burner disposed to direct a flame into said chamber, means for supporting, adjacent said chamber, a charge of material to be incinerated, heat sensing means disposed to receive heat from said chamber so that its temperature will vary in proportion to that of said chamber, a blower energizable to supply air to the burner, means including a motor pump for supplying fuel to said burner, means for igniting the fuel, a normally closed first switch and a normally open second switch both connected to and operable by said heat sensing means to open and closed positions respectively when said sensing means is heated to a predetermined temperature, said blower, pump, igniting means and switches being operable in a cycle comprising flame starting and maintaining events, means operable to transfer said charge from supporting means to said combustion chamber, cycle starting means connected for operation by said transfer means, first means responsive to the operation of said cycle starting means for energizing said motor pump and igniting means, means responsive to a predetermined temperature of said combustion chamber for rendering said fuel supplying system ineffective, means including said first switch cooperating with said first means for energizing said blower and additional means including said second switch for holding said blower energized independently of said first means.

10. In an incinerating device, the combination of means defining a combustion chamber, a fuel burner disposed to direct a flame into said chamber, means for supporting, adjacent said chamber, a charge of material to be incinerated, means operable to transfer said charge to said chamber, cycle starting means connected for operation by said transfer means, a blower, a conduit connecting the blower with the burner, a motorized air valve in said conduit, means including a motor pump for supplying fuel to the burner, means for igniting the fuel, said blower, valve, pump and igniting means being operable in a cycle comprising flame starting and maintaining events, means responsive to the operation of said cycle starting means for energizing said valve to open it, and for energizing said blower, said pump and said igniting means, and means responsive to a predetermined temperature of said combustion chamber for rendering said fuel supplying means ineffective.

11. In an incinerating device, the combination of means defining a combustion chamber, a fuel burner disposed to direct a flame into said chamber, a charge agitator disposed in said chamber, a motor for driving the agitator, means for supporting, adjacent said chamber, a charge of material to be incinerated, means operable to transfer said charge to said chamber, cycle starting means connected for operation by said transfer means, a blower, a conduit connecting the blower with the burner, a motorized air valve in said conduit, means including a motor pump for supplying fuel to the burner, means for igniting the fuel, said blower, valve, pump and igniting means being operable in a cycle comprising flame starting and maintaining events, means responsive to the operation of said cycle starting means for energizing said air valve to open it, and for energizing said blower, said pump, said agitator motor and said igniting means, and means responsive to a predetermined temperature of said combustion chamber for rendering said fuel supplying means ineffective.

12. In an incinerating device, the combination of means defining a combustion chamber, a fuel burner disposed to direct a flame into said chamber, means for supporting, adjacent said chamber, a charge of material to be incinerated, means operable to transfer said charge to said chamber, cycle starting means connected for operation by said transfer means, heat sensing means disposed to receive heat from said chamber so that its temperature will vary in proportion to that of said chamber, a blower, a conduit connecting said blower with the burner, an air valve in said conduit, means including a motor pump for supplying fuel to the burner, means for igniting the fuel, a normally closed first switch and a normally open second switch both connected to and operable by said heat sensing means to open and closed positions respectively when said sensing means is heated to a predetermined temperature, said blower, valve, pump and igniting means being operable in a cycle comprising flame starting and maintaining events, first means, responsive to the operation of said cycle starting means, for energizing said motor pump and igniting means, means responsive to a predetermined temperature of said combustion chamber for rendering said fuel supplying system ineffective, means including said first switch, cooperating with said first means, for energizing said blower and for opening said air valve, and additional means including said second switch for holding said blower energized and said air valve open independently of said first means.

13. In an incinerating device, the combination of means defining a combustion chamber, a fuel burner disposed to direct a flame into said chamber, a motor, a charge agitator mounted in said chamber and connected to be driven by the motor, means for supporting, adjacent said chamber, a charge of material to be incinerated means operable to transfer said charge to said chamber, cycle starting means connected for operation by said transfer means, heat sensing means disposed to receive heat from said chamber so that its temperature will vary in proportion to that of said chamber, a blower, a conduit connecting said blower with the burner, an air valve in said conduit, means including a motor pump for supplying fuel to the burner, means for igniting the fuel, a normally closed first switch and a normally open second switch both connected to and operable by said heat sensing means to open and closed positions respectively when said sensing means is heated to a predetermined temperature, said blower, valve, pump and igniting means being operable in a cycle comprising flame starting and maintaining events, first means, responsive to the operation of said cycle starting means, for energizing said motor pump and igniting means, means responsive to a predetermined temperature of said combustion chamber for rendering said fuel supplying system ineffective, means including said first switch, cooperating with said first means, for energizing said blower, said agitator motor and for opening said air valve, and additional means including said second switch for holding said blower and agitator motor energized and said air valve open independently of said first means.

14. In an incinerating device, the combination of wall means defining a combustion chamber, a fuel burner disposed to direct a flame into said chamber, means for supporting adjacent said chamber, a charge of material to be incinerated, means operable to transfer said charge to said chamber, cycle starting means connected for operation by said transfer means, a blower energizable to supply air to the burner, means including a motor pump for supplying fuel to said burner, means for igniting the fuel, said blower, pump, valve and igniting means being operable in a cycle comprising flame starting, maintaining and extinguishing events, means responsive to operation of said cycle starting means for energizing said blower, motor pump and igniting means, a thermostatic switch including heat sensing means disposed to receive heat from said wall means to be heated thereby to a temperature proportional to that of said wall means, said switch being normally closed, being adapted to open at a predetermined high temperature and forming a part of said energizing means, said switch when opened serving to render said fuel supplying means ineffective.

15. In an incinerating device, the combination of wall means defining a combustion chamber, a fuel burner disposed to direct a flame into said chamber, means for supporting, adjacent said chamber, a charge of material to be incinerated, means operable to transfer said charge to said chamber, cycle starting means connected for operation by said transfer means, a blower energizable to supply air to the burner, means including a motor pump for supplying fuel to said burner, means for igniting the fuel, said blower, pump and igniting means being operable in a cycle comprising flame starting, maintaining and extinguishing events, means responsive to operation of said cycle starting means for energizing said blower, motor pump and igniting means, a first thermostatic switch including heat sensing means disposed to receive heat from said wall means to be heated thereby to a temperature proportional to that of said wall means, said switch being normally closed, adapted to open at a predetermined high temperature and forming a part of said energizing means, said switch when opened serving to render said fuel supplying means ineffective, a second normally closed thermostatic switch including a heat sensing means disposed to receive heat from said wall means so that its temperature will vary in proportion to that of said wall means, additional circuit means including said second thermostatic switch for holding said blower energized, said second switch being closed at a predetermined high temperature of said sensing means.

16. In an incinerating device, the combination of wall means defining a combustion chamber, a fuel burner disposed to direct a flame into said chamber, means for supporting, adjacent said chamber, a charge of material to be incinerated, means operable to transfer said charge to said chamber, cycle starting means connected for operation by said transfer means, a blower energizable to supply air to the burner, means including a motor pump for supplying fuel to said burner, means for igniting the fuel, said blower, pump and igniting means being operable in a cycle comprising flame starting, maintaining and extinguishing events, means responsive to operation of said cycle starting means for energizing said blower, motor pump and igniting means, means responsive to a predetermined temperature of said combustion chamber for rendering said fuel supplying system ineffective and a normally closed thermostatic switch means including a sensing element disposed to receive heat from said burner, said switch serving to deenergize said igniting means when said sensing means reaches a predetermined high temperature.

17. In an incinerating device, the combination of wall means defining a combustion chamber, a fuel burner disposed to direct a flame into said chamber, means for supporting, adjacent said chamber, a charge of material to be incinerated, means operable to transfer said charge to said chamber, cycle starting means connected for operation by said transfer means, a blower energizable to supply air to the burner, means including a motor pump for supplying fuel to said burner, means for igniting the fuel, said blower, pump and igniting means being operable in a cycle comprising flame starting, maintaining and extinguishing events, means responsive to operation of said cycle starting means for energizing said blower, motor pump and igniting means, a first thermostatic switch including heat sensing means disposed to receive heat from said wall means so that its temperature will vary in proportion to that of said wall means, additional circuit means including said thermostatic switch for holding said blower energized, said switch being closed at a predetermined high temperature at said sensing means, a second, normally closed, thermostatic switch including a heat sensing means disposed to receive heat from said wall means so that its temperature will vary in proportion to that of said wall means, a third, normally closed, settable thermostatic switch including a heat sensing means disposed to receive heat from said wall means, said third switch being set to open at a higher temperature than the second thermostatic switch and being connected in series therewith and with said fuel supplying means so that said fuel supplying means will be rendered ineffective when either said second or third thermostat opens to terminate the burning cycle.

18. In an incinerating device, the combination of wall means defining a combustion chamber, means, disposed adjacent said chamber, for supporting a charge of material to be incinerated, means operable to transfer said charge to said chamber, a normally open, momentary contact, cycle initiating switch connected for operation by said transfer means, a fuel burner disposed to direct a flame into said chamber, a blower, a motor therefor, a conduit connecting said blower to said burner, a valve mounted in said conduit, a reversible motor for opening and closing the valve, a fuel pump, a motor for driving the pump, a discharge line for connecting said pump to the burner, a normally closed fuel valve in said line, a motor for opening the valve, a fuel displacement means connected in parallel with said fuel valve, said displacement means being operable by said pump to supply a predetermined quantity of fuel to said burner through said discharge line, a charge agitator mounted in said chamber, a motor for driving said agitator, an igniter disposed adjacent said burner and energizable to ignite the fuel, a two pole switch having a normal position in which it connects the igniter to a power line and a second position in which it connects the valve motor to said power line, heat actuated means disposed to be heated by said burner and adapted when heated to set said switch in its second position, means for closing said initiating switch, a first relay, a source of electric current, means responsive to closure of said initiating switch for closing said first relay to connect said power line with said source and a second relay connected to be energized by said first relay, and adapted to connect said agitator, blower and air valve motors with said source.

19. The structure defined in claim 18, wherein said first relay, when energized, establishes a holding circuit to hold itself energized, said holding circuit including a normally closed switch, additional heat sensing means disposed to sense the temperature of said wall means and connected to open said additional switch when said temperature exceeds a predetermined amount to break said holding circuit and the connection between said source and said line.

20. The structure defined in claim 18 wherein said first relay, when energized, establishes a holding circuit to hold itself energized, said connection between said first and second relays including an additional two pole switch, which is normally closed through one pole to maintain said connection but which is movable to close the second pole to break said connection and to connect said second relay directly to said source, and temperature sensing means disposed to respond to the temperature of said wall means for moving said additional switch to close said second pole when a predetermined temperature is attained by said sensing means so that said second relay will be held energized irrespective of the condition of said first relay.

21. The structure defined in claim 18 wherein said first relay establishes a holding circuit for itself, said holding circuit including a normally closed switch, first temperature sensing means disposed to sense the temperature of the wall means and adapted to open said normally closed switch to break the holding circuit when said temperature exceeds a predetermined temperature, said connecting circuit between the first and second relays including a second two pole switch which is normally closed through one pole in said connecting circuit, a second temperature sensing unit disposed to sense the temperature of said wall means and connected to open the first pole of said second two pole switch and close the second pole thereof which is connected to said source, when the temperature of the wall exceeds a predetermined safe recycling temperature, so that said agitator, blower and air valve motors will be held in operative conditions even though said pump and fuel valve motors are deenergized.

22. The structure defined by claim 18 wherein the means responsive to closure of the initiating switch includes a third relay having contacts for closing a circuit connecting said first relay to said source for energization thereby, said last named circuit including a control switch which is normally closed, temperature sensing means disposed to sense the temperature of said wall means and to open the control switch when said temperature exceeds a predetermined minimum, said first relay including contacts which are operable when said first relay is deenergized for holding said third relay energized if said control switch is open when said initiating switch is closed.

23. In an incinerating device, the combination of means defining a combustion chamber, a fuel burner including a nozzle disposed to direct a flame into said chamber, a blower, a motor therefor, a conduit connecting said blower with said burner, a valve in said conduit, a reversible motor for opening and closing said valve, a fuel pump, a motor for driving said pump, a fuel discharge line connecting said pump with said nozzle, a normally closed fuel valve in said discharge line, a motor for opening said valve, a fuel displacement means adapted to hold a predetermined quantity of fuel, said displacement means being connected to the fuel line in parallel with said fuel valve and being operable by the fuel pump, when it starts, to discharge said predetermined quantity of fuel to said nozzle, fuel igniting means, means for supporting adjacent said chamber, a charge of material to be incinerated, said blower, valve, pump, fuel valve and fuel igniting means being operable in a cycle comprising flame igniting, maintaining and extinguishing events, means operable to transfer said charge to said chamber, a cycle starting switch, operating means connected for operation by said transfer means to momentarily close said switch, a first relay connected to be energized by said cycle starting switch and having a first switch, a second relay having a normally closed second and a normally open third switch, means including a first thermostatic switch connecting the first switch to energize the second relay, means connecting said first and second switches in series to hold the first relay energized, a third relay, a second thermostatic switch having a normally closed fourth switch, a normally open fifth switch and means mounted adjacent said combustion chamber and responsive to a predetermined high temperature of said combustion chamber for opening said fourth switch and closing said fifth switch, means connecting said third switch and fourth switch to energize the third relay, additional means responsive to the closure of said fifth switch for holding said third relay energized independently of said second relay, a flame detector mechanism having a normally closed sixth switch and a normally open seventh switch, said sixth switch connecting said third switch to energize said igniting means, said seventh switch connecting said third switch to open the fuel valve, heat sensing means disposed adjacent the burner adapted, when heated, to open said sixth switch and close said seventh switch, means connecting said third switch to energize said pump motor, said third relay including a normally closed eighth switch and a normally open ninth switch, means including said eighth switch and a limit switch for supplying current to said reversible motor in a direction to close the air valve, means including said ninth switch to energize said blower and agitator and further means including said ninth switch and a second limit switch to supply current to said reversible motor in a direction to open said air valve, means connecting said limit switches together and for operation by said motor so that one is closed when the other is opened, so as to stop said reversible motor when the valve has been fully actuated in either direction and to condition the current supplying means for subsequently operating said motor in a reverse direction, third and fourth normally closed thermostatic switches connected in series with said third switch and said second relay to hold said second relay energized, said thermostatic switches each having heat sensing means disposed to be heated in proportion to the temperature of said combustion chamber and constructed to open said third and fourth thermostatic switches at different temperatures.

References Cited in the file of this patent

UNITED STATES PATENTS

| | | |
|---|---|---|
| 610,443 | Griffin et al. | Sept. 6, 1898 |
| 1,155,492 | Krenz | Oct. 5, 1915 |
| 1,293,141 | McGary | Feb. 4, 1919 |
| 1,817,033 | Graver | Aug. 4, 1931 |
| 2,005,832 | Vidalie | June 25, 1935 |
| 2,102,544 | Raisch | Dec. 14, 1937 |
| 2,114,257 | Thomas | Apr. 12, 1938 |
| 2,117,487 | Lewers | May 17, 1938 |
| 2,167,653 | Holbrook et al. | Aug. 1, 1939 |
| 2,279,578 | Martin | Apr. 14, 1942 |
| 2,418,712 | Heymann | Apr. 8, 1947 |
| 2,568,107 | Allen | Sept. 18, 1951 |
| 2,596,290 | Ryder et al. | May 13, 1952 |
| 2,674,304 | Trimble et al. | Apr. 6, 1954 |
| 2,678,450 | Simpson et al. | May 18, 1954 |
| 2,720,916 | Spackman | Oct. 18, 1955 |
| 2,748,728 | Triggs | June 5, 1956 |
| 2,748,844 | Gilchrist | June 5, 1956 |
| 2,768,386 | Graef et al. | Oct. 30, 1956 |
| 2,771,533 | Osberg et al. | Nov. 20, 1956 |
| 2,804,919 | Kinnison | Sept. 3, 1957 |
| 2,835,214 | Harm | May 20, 1958 |
| 2,835,215 | Harm | May 20, 1958 |
| 2,882,534 | Jauch et al. | Apr. 21, 1959 |

FOREIGN PATENTS

| | | |
|---|---|---|
| 1,088,922 | France | Sept. 22, 1954 |